April 19, 1966     L. CLEMENS     3,246,826
KNOCK-DOWN STORAGE BIN AND CONNECTING CAP Filed Sept. 4, 1964     2 Sheets-Sheet 1

Inventor:
Ludwig Clemens,
ATTORNEY

April 19, 1966     L. CLEMENS     3,246,826
KNOCK-DOWN STORAGE BIN AND CONNECTING CAP
Filed Sept. 4, 1964     2 Sheets-Sheet 2

Inventor:
Ludwig Clemens,

ATTORNEY

United States Patent Office

3,246,826
Patented Apr. 19, 1966

3,246,826
KNOCK-DOWN STORAGE BIN AND
CONNECTING CAP
Ludwig Clemens, Wiesbadener Strasse 91,
Wiesbaden-Kastel, Germany
Filed Sept. 4, 1964, Ser. No. 394,629
6 Claims. (Cl. 229—23)

The invention relates to knock-down portable storage bins, and relates more particularly to such storage bins which may be stored and return shipped in flat form, but are erectable into storage bin form for the transport and storing of goods.

Bins of this general description are known, but have the disadvantage that they consume a great deal of material and labor in the manufacture.

It is accordingly among the principal objects of the invention to provide a knock-down storage bin which consumes but little material, and is easy to blank and to erect from the blank, resulting in low cost manufacture.

It is a further object of the invention to provide such a knock-down storage bin which is particularly suited for the transport and storing of agricultural products, such as fruit and vegetables.

It is another object of the invention to provide such a knock-down storage bin which has reinforcements formed in each corner of two interconnectable parts, and a connecting cap for each corner.

It is yet another object of the invention to provide such a cap that is composed of synthetic resin and that fits over the two reinforcements of each corner of one bin and acts to support and laterally to secure another bin stacked above the one bin.

It is still another object of the invention to provide such a cap that is easily and rapidly applied and holds securely in place, and yet is easily manually removed, and may be manufactured at low cost.

Further objects and advantages of the invention will be set forth in part in the following specification, and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

Reference is had to my co-pending application Serial No. 123,265, filed July 11, 1961, now Patent No. 3,147,-908, dated September 8, 1964.

The foregoing and other objects of the invention will be best understood from the following description of exemplifications thereof, reference being had to the accompanying drawings, wherein.

Figure 1:
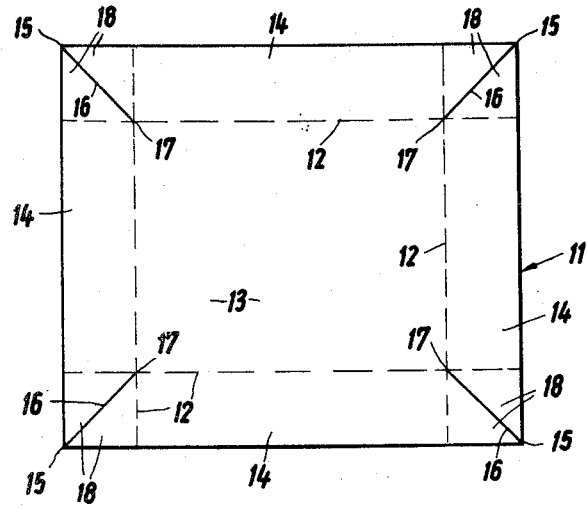
FIG. 1 is a plan view of a blank for a knock-down storage bin, in accordance with an embodiment of the invention.
Figure 2:
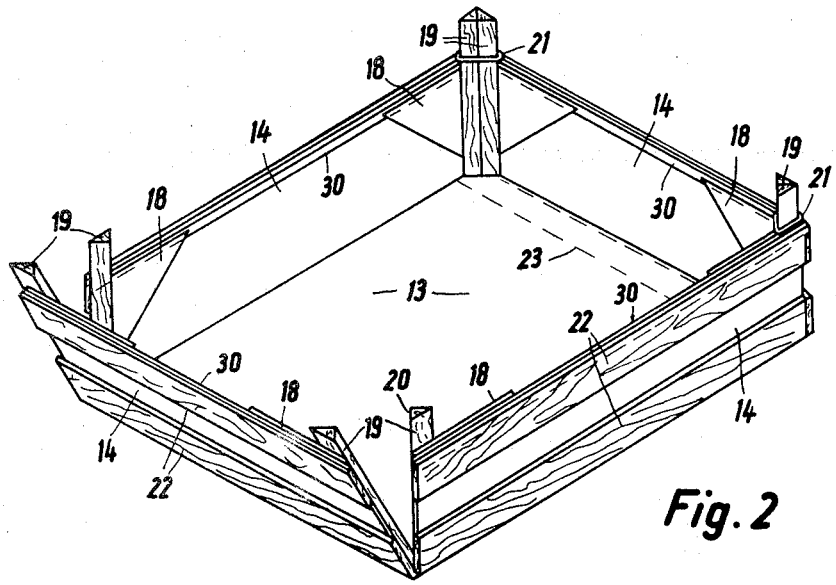
FIG. 2 is a perspective view of an almost completely assembled bin formed from a blank of the type shown in FIG. 1.

In carrying the invention into effect in the embodiments which have been selected for illustration in the accompanying drawings and for description in this specification, and referring now particularly to FIGS. 1 and 2, there is provided a blank 11 from which there may be fashioned the bin of FIG. 2. The blank 11 has a multi-sided contour, for instance a rectangular contour, and has accordingly multiple corners, for instance four corners as shown in FIG. 1.

The blank 11 is composed of a suitable material, for instance of cardboard, paperboard, corrugated paper, plywood, wicker or other wooden band weave, or foil or plastic sheet or plastic foil, or the like. Where the material used is corrugated paper, it may first have been impregnated by spraying, dipping or rolling to increase either its strength or its life, or its resistance to moisture. Where plywood is used, it may be of a type which is made bendable or foldable or pliable at the creases by any well-known suitable process. Lastly, the material may be impregnated cardboard, foil, plywood, or plastic sheet or plastic foil, or the like.

The foregoing listing of material is, it will be observed, intended to be illustrative and not exhaustive.

The blank 11 has four creases 12 which are parallel to the outer edges, and near the corners the creases 12 intersect each other. Each crease 12 defines with its outer edge of the blank 11 a strip, and each strip includes a flap or flap portion 14. The creases 12 surround a base or base portion 13.

At each corner the blank 11 has a cut or incision 16 which substantially bisects the corner and extends from the tip 15 of the corner to the point of intersection 17 of the creases 12 at that corner. A triangular portion 18 is defined on each flap 14 between the cut 16 and a terminal portion of the crease 12 that continues through the width of said flap from the point 17 thereof. The two triangular portions 18 of each flap 14, as best shown in FIG. 2, are folded about the terminal crease portions and lie flat against the flap 14 out of which they have been bent, and are connected to the body of the flap, for instance by gluing or stapling, or the like.

In each corner there are provided two reinforcements or reinforcement parts 19. Two reinforcements 19 are connected to each flap in such a manner that each reinforcement is adjacent a corner, and in the erected position the two reinforcements 19 of adjoining flaps 14 in one corner will be positioned close to one another. The reinforcements 19 are made of any suitable rigid material, for instance wood, cardboard, papiermaché, plastic, metal, or the like. Each reinforcement has a cross section that has at least one right angle, preferably a right angle triangle, so that the two adjoining reinforcements 19 of one corner together will also be of triangular cross section.

Each reinforcement 19 is secured to its flap 14, either by gluing or stapling or in any other suitable manner, and each engages the other reinforcement in the corner along an inner surface 20.

When the bin is knocked down and the flaps 14 are flush with the bottom 13, the reinforcements 19 even of the same corner will be separated from each other. When the bin has been erected by bending upright the flaps 14, however, the reinforcements 19 of each corner will be side-by-side, engaging each other along the inner surface 20, as shown in FIG. 2.

The pair of reinforcements 19 of each corner serves as a support for the next upper bin, during stacking of the bins. For this purpose, the reinforcements 19 extend upwardly beyond the upper edges of the sidewall that is formed by the flaps 14. Following the erection of the bin, the two reinforcements 19 of each corner are interconnected, either permanently or releasably.

Figure 3:
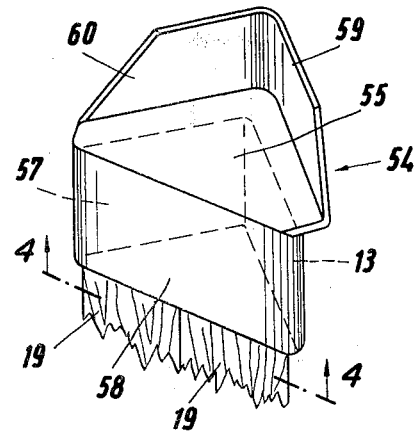
FIG. 3 is a fragmentary large scale perspective view of a corner post of the bin surmounted by a cap in accordance with a preferred embodiment of the invention.
Figure 4:
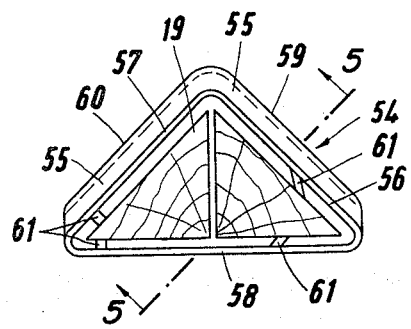
FIG. 4 is a sectional view taken on the line 4—4 of FIG. 3.
Figure 5:
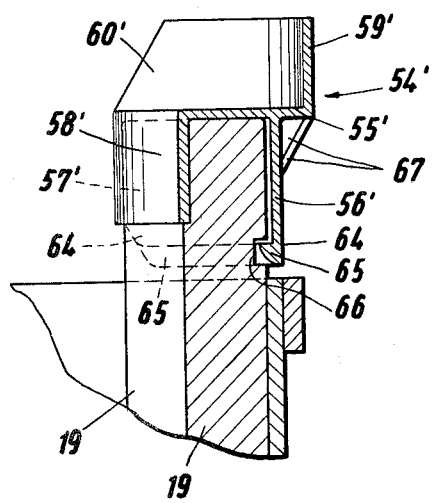
FIG. 5 is a fragmentary sectional view, taken on the line 5—5 of FIG. 4, but embodying a modification.

In accordance with a preferred embodiment, the two reinforcements 19, upon being completed into a two-piece corner post, are releasably connected by a connecting cap 54 (FIGS. 3–5). The connecting cap 54 is made of one piece, and is composed of synthetic resin.

The cap 54 is characterized therein that it is inexpensive and simple and quickly mounts on the corner post. Each of the four corner posts of the bin will carry a cap 54.

Each cap 54 comprises a horizontal triangular platform 55, to the bottom of which there are connected three bottom side walls 56, 57 and 58 that define a triangular channel that is closed all around except having an open bottom. The three sidewalls form an equilateral rectangular triangle, the longest side (hypotenuse) 58 of which is connected at the inner edge of the platform 55; the other equilateral sides 56 and 57, on the other hand, as best shown in FIGS. 16 and 17, are offset from the outer edges of the platform 55, providing on the cap 54 a projecting shoulder that extends along the two equilateral sides.

Two rectangularly disposed low upper sidewalls 59 and 60 project uprightly from the shoulder edges of the platform 55, and the upper side walls 59 and 60 are interconnected along the edge of their intersection.

The lower sidewalls 56, 57, 58 are preferably tapered on the interior for imparting to the channel a corresponding taper. To promote the frictional holding of the cap 54 on the post, internal inclined ribs 61 may be provided on the interior of the lower sidewalls 56–58. These ribs 61, upon mounting of the cap 54 on the post that is formed by the reinforcements 19, will yieldingly engage the surfaces of the post.

The platform 55 is preferably roughened at its top. The platform 55 forms a support for the next upper storage bin of the stack. As previously described, the platform 55 projects laterally, with its shoulder, beyond the outline of the lower sidewalls 56 and 57, and carries there the upright upper sidewalls 59 and 60. This lateral projection serves to accommodate the external dimensions of the next upper bin, which are larger than the distances between the posts (see FIG. 2), and also serves to accommodate any deviations in dimensions of the next upper storage bin. The upper side walls 59 and 60 have the purpose to secure laterally the position of the next upper storage bin.

As best shown in FIG. 5, the equilateral sidewalls 56' and 57' each are provided with an extension 64 and an inwardly turned projection 65. The projection 65 engages a surface 66 that is recessed, in the reinforcement 19. This restrains accidental removal of the cap 54 off the reinforcements 19 of a post.

External ribs 67 may be provided between the exterior of the lower sidewalls 56' and 57' and the protruding shoulder portion of the platform 55'.

In assembling the storage bin, the operator will bend the flaps 14 upwardly, from the position of alignment with the bottom 13, into the erected position. In the erected position the operator will attach the cap 54.

Reinforcing means may be provided, such as strips 22 to provide for strengthening and stiffening of the sidewalls 14 adjacent the top edges thereof. These reinforcing means may be composed of wood or cardboard, paper board, or corrugated board, or the like. The strips 22 may be mounted in any suitable manner, for instance by gluing, or by means of staples.

Similar reinforcing means may also be applied near the bottom edge of the sidewall, as shown in FIG. 2, and may also be applied to the bottom 13, as shown in FIG. 2 in broken lines at 23. These or similar reinforcing means may be applied either to the exterior or to the interior surface of the bottom 13 or flaps 14.

In order to prevent the entry of moisture, either in vapor or liquid form, particularly at the upper edges of the sidewall, there may be provided guards 30 superposed throughout on the edges to protect them. The guards 30 may be composed of folded strips of water resistant or water repellent flexible material such as impregnated paper, foil or the like that may carry glue on the inner surface.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A storage bin operable to be stacked with similar storage bins, and being formed of, and operative to be knocked down to, a flat creased piece of stiff impregnated paperboard comprising a bottom wall and side walls integral with the bottom wall, said creases being formed between the bottom wall and the side walls, each side wall being movable about a crease to and from an upright position, two reinforcement rods of triangular cross section secured to each side wall on the interior of the storage bin and movable with the side walls, each reinforcement rod being disposed near an upright edge of the side wall in such a manner that the adjacent reinforcement rods of two adjoining side walls in the upright position complete a two-piece corner post of triangular cross section having its widest surface facing the interior of the storage bin, said posts in the upright position surmounting said bottom wall and projecting upwardly beyond the confines of all the side walls, a connecting cap composed of synthetic resin including three bottom side walls confining a triangular space being tightly fitted over the adjacent reinforcement rods of each post and being provided with an upper triangular planar platform including two rectangularly disposed low upper side walls projecting upwardly from said platform and being adapted to secure laterally the position of the next upper storage bin stacked over said bin.

2. In a storage bin, as claimed in claim 1, said platform having portions protruding horizontally beyond the outer contour of said bottom side walls.

3. In a storage bin, as claimed in claim 1, at least one of said bottom side walls comprising an inwardly turned projection operable to engage a surface recessed in said corner post for increasing the retention friction of the cap on the post.

4. In a storage bin, as claimed in claim 1, the three bottom side walls of said cap being thin and defining a triangular channel open at the bottom and closed throughout elsewhere, said open bottom matching the outline of the two reinforcement rods joined in a corner post.

5. A connecting cap composed of synthetic resin, for use in connection with a two-piece triangular corner post of an assembled storage bin adapted to be placed within a stack of similar storage bins, said cap comprising three bottom side walls confining a triangular space matching the outline of said post and adapted to fit tightly over said post, an upper triangular planar platform, and two rectangularly disposed low upper side walls projecting upwardly from said platform and being adapted to secure laterally the position of the next upper storage bin of the stack.

6. A connecting cap composed of synthetic resin, for use in connection with a two-piece corner post, of equilateral rectangle triangular external shape, of an assembled storage bin adapted to be placed within a stack of similar storage bins, said cap comprising three bottom side walls defining a triangular channel closed throughout save at the bottom, said channel having an internal outline of an equilateral rectangular triangle matching the external outline of said post and adapted to fit with said open bottom tightly over said post, an upper planar triangular platform surmounting said bottom side walls and forming a support for the next upper storage bin of the stack, and two rectangularly disposed upper side walls projecting upwardly from said platform and being adapted to secure laterally the position of the next upper storage bin.

References Cited by the Examiner

UNITED STATES PATENTS

| | | |
|---|---|---|
| 2,507,929 | 5/1950 | Pennebaker. |
| 2,878,982 | 3/1959 | Garipy. |
| 3,147,908 | 9/1964 | Clemens _____ 229—23 |

FOREIGN PATENTS

| | | |
|---|---|---|
| 911,090 | 11/1962 | Great Britain. |
| 964,940 | 7/1964 | Great Britain. |
| 1,236,481 | 6/1960 | France. |
| 1,267,128 | 6/1961 | France. |
| 609,252 | 9/1960 | Italy. |

JOSEPH R. LECLAIR, *Primary Examiner.*

FRANKLIN T. GARRETT, *Examiner.*